United States Patent [19]

Saito

[11] 4,413,333

[45] Nov. 1, 1983

[54] ROTARY RECORDING MEDIUM REPRODUCING APPARATUS

[75] Inventor: Takashi Saito, Ayase, Japan

[73] Assignee: Victor Company of Japan, Ltd., Yokohama, Japan

[21] Appl. No.: 357,207

[22] Filed: Mar. 11, 1982

[30] Foreign Application Priority Data

Mar. 12, 1981 [JP] Japan .................................. 56-35574

[51] Int. Cl.³ ...................... G11B 17/04; G11B 23/04
[52] U.S. Cl. ................................................... 369/77.2
[58] Field of Search ..................................... 369/75, 77

[56] References Cited

U.S. PATENT DOCUMENTS 4,352,174  9/1982  Tajima et al. ...................... 369/77.2
4,384,352  5/1983  Saito et al. ........................ 369/77.2

FOREIGN PATENT DOCUMENTS

2098377  11/1982  United Kingdom ............... 369/77.2
2098380  11/1982  United Kingdom ............... 369/77.2
2098784  11/1982  United Kingdom ............... 369/77.2

Primary Examiner—Steven L. Stephan
Attorney, Agent, or Firm—Louis Bernat

[57] ABSTRACT

A rotary recording medium reproducing apparatus reproduces a rotary recording medium accommodated within a case. The case comprises a jacket provided with a space for accommodating the rotary recording medium and an opening for allowing the rotary recording medium to go in and out of the jacket, and a lid member inserted through the opening of the jacket for closing the opening of the jacket. The rotary recording medium reproducing apparatus comprises an inserting opening through which the case is inserted, a lid member locking and holding mechanism provided at an innermost part of the reproducing apparatus, for locking and leaving the lid member inside the reproducing apparatus when the case is inserted into the reproducing apparatus, and for releasing the locking with respect to the lid member when an empty jacket is inserted into the reproducing apparatus, a lid member connection releasing mechanism for releasing connection of the lid member with respect to the jacket when the case is inserted into and then pulled out from the reproducing apparatus, and for connecting the lid member to the empty jacket when the jacket is inserted into and then pulled out from the reproducing apparatus, a lid member push-back mechanism for pushing back the lid member released from locking in a direction approaching the empty jacket which is inserted, interrelatedly with the locking releasing operation of the lid member locking and holding mechanism, and a mechanism maintained inoperative upon insertion of the case, and rendered operative upon insertion of the empty jacket, for limiting a final insertion position of the empty jacket inside the reproducing apparatus to a halfway position. The halfway position is a position where the lid member locking and holding mechanism operates to release the locking of the lid member and the lid member push-back mechanism operates but where the lid member connection releasing mechanism remains inoperative.

6 Claims, 14 Drawing Figures

ROTARY RECORDING MEDIUM REPRODUCING APPARATUS

BACKGROUND OF THE INVENTION

The present invention relates to rotary recording medium reproducing apparatuses capable of placing and leaving a rotary recording medium in a state possible for reproduction within the rotary recording medium reproducing apparatus when a jacket (disc case) having a lid for accommodating the rotary recording medium therein is inserted into and then pulled out from within the rotary recording medium reproducing apparatus, and also capable of incasing the rotary recording medium within the jacket so that the rotary recording medium can be obtained outside the rotary recording medium reproducing apparatus together with the jacket, when the empty jacket is inserted into and then pulled out from within the reproducing apparatus. The present invention further and especially relates to the above type of a rotary recording medium reproducing apparatus constructed to achieve reliable operation of incasing and recovering the rotary recording medium with respect to the jacket.

Conventionally, in an apparatus for reproducing a rotary recording medium (referring to video disc, PCM audio disc, and the like, and hereinafter simply referred to as a disc), there are types of apparatuses in which a disc is reproduced when the disc is loaded upon holding and placing of the disc within the reproducing apparatus, by inserting into and then pulling out a disc case which has a lid and accommodates a disc therein, from within the reproducing apparatus.

As a conventional apparatus of this type, a reproducing apparatus was proposed in a U.S. patent application Ser. No. 231,868 filed Feb. 5, 1981, entitled "DISC-SHAPED RECORDING MEDIUM REPRODUCING APPARATUS" in which the assignee is the same as that of the present application. This previously proposed reproducing apparatus operates together with a disc case comprising a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, lock releasing means provided at an innermost part of the opposite side from the inserting opening with respect to the turntable, for releasing locking of the lid member to the jacket, holding means also provided at the innermost part, for holding the lid member which is set free from the connection with respect to the jacket, lowering and raising means for lowering the disc to a position where the disc is placed on the turntable from a holding position where the disc is held by the holding means upon starting of the reproducing and raising the disc to the holding position from the turntable upon finishing or discontinuing of the reproduction, a reproducing transducer for reproducing the disc placed on the turntable, and moving means for moving the reproducing transducer from a waiting position to a reproducing position with respect to the disc.

In the above reproducing apparatus, when an empty jacket is inserted into the reproducing apparatus to recover the disc inside the jacket, the lid member connection releasing means and the lid member holding means are respectively restored to their original states, and the lid member is released from the holding state to be connected to the jacket.

In this reproducing apparatus, the lid member holding means is adapted to operate when pushed by the front of the lid member, to hold the lid member when the disc case is inserted into the apparatus. This lid member holding means is also adapted to operate when pushed by the lid member which is held within the apparatus, to release the holding of the lid member when the empty jacket is inserted into the same apparatus. That is, noting the insertion position of the jacket with respect to the reproducing apparatus, the final insertion position upon holding of the lid member and the final insertion position upon releasing the holding of the lid member, are substantially the same position. Accordingly, referring to the connection operation of the lid member to the jacket upon recovering of the disc, when the jacket is pulled backwards after the jacket is inserted into the apparatus to reach the same position as in the case of a disc loading mode, the lid member follows the jacket due to the action of a spring and becomes connected to the jacket.

Moreover, there are cases where an operation is performed to insert the jacket into the final position and then pull out the jacket in a rapid manner, upon recovering of the disc within the jacket. When the jacket is pulled out rapidly, the speed with which the jacket is pulled out may exceed the speed with which the lid member is pushed back by the spring. In this case, the lid member cannot follow the movement of the jacket, and only the jacket is pulled out from the reproducing apparatus without being connected to the lid member. Accordingly, the disc cannot be recovered within the jacket in this case.

That is, in the conventional reproducing apparatus, there was a disadvantage in that the disc cannot be recovered within the jacket, when the operation to recover the disc from the reproducing apparatus is performed in a rapid manner.

SUMMARY OF THE INVENTION

Accordingly, it is a general object of the present invention to provide a novel and useful rotary recording medium reproducing apparatus having a mechanism for connecting a lid member to a jacket, in which the above described problems have been overcome.

Another and more specific object of the present invention is to provide a rotary recording medium reproducing apparatus adapted to release the holding of the lid member at a point when the jacket is inserted up to a halfway position, and to push back the released lid member toward the jacket, and still further, to limit the final insertion position of the jacket to a position which is towards the front of the reproducing apparatus from an anticipated position where the lid member holding means operates, when an operation is performed in which the jacket is inserted into the reproducing apparatus and then pulled out from the reproducing apparatus in order to recover a rotary recording medium inside the reproducing apparatus. According to the apparatus of the present invention, the connection of the lid member with respect to the jacket is positively performed even when an operation is performed in which the jacket is rapidly pulled out from the reproducing apparatus, and the rotary recording medium can be positively recovered within the jacket.

Other objects and further features of the present invention will be apparent from the following detailed description when read in conjunction with the accompanying drawings.

DETAILED DESCRIPTION

Figure 1:
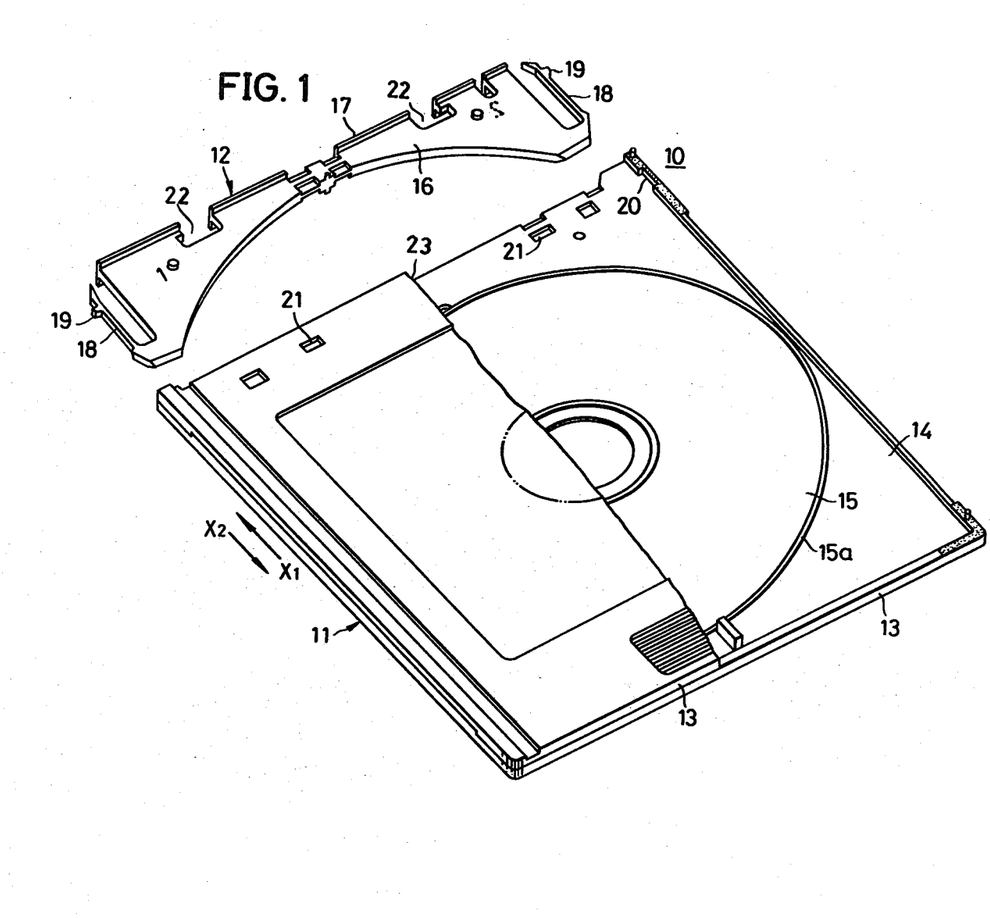
FIG. 1 is a perspective view, with a part cut away and disassembled, showing an example of a disc case which operates together with a rotary recording medium reproducing apparatus according to the present invention.

In FIG. 1, a disc case 10 comprises a jacket 11 and a lid plate 12. The jacket 11 is assembled from a pair of jacket halves 13 and 13, and comprises a flat cavity or space 14 therein. An opening 23 is provided on one side of the jacket 11, and the space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 connects with the jacket 11.

Figure 2:
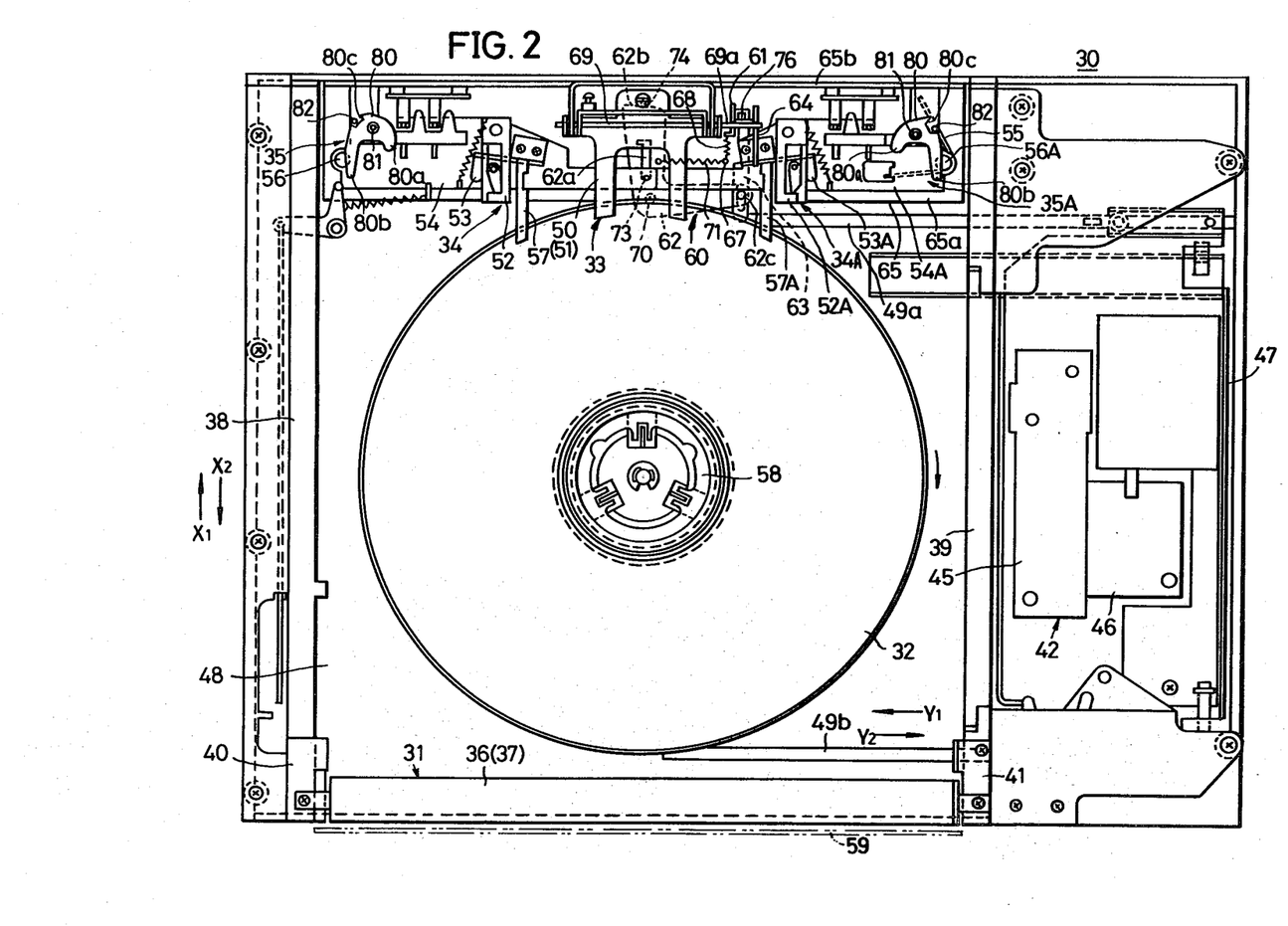
FIG. 2 is a plan view showing the inner construction of an embodiment of a rotary recording medium reproducing apparatus according to the present invention.

As shown in FIG. 2, a reproducing apparatus 30 substantially comprises a jacket opening enlarging mechanism 31, a turntable 32 to rotate the disc 15 positioned thereon, a disc holding mechanism 33 for clamping the disc 15, a lid plate locking and holding mechanism 34 and 34A for locking and holding the lid plate 12 upon disc loading operation and for releasing the locking and holding of the lid plate 12 upon recovering the disc, lid plate connection releasing mechanisms 35 and 35A for releasing the connection of the lid plate 12 with respect to the jacket 11 upon disc loading operation, and the like.

The jacket opening enlarging mechanism 31 comprises upper and lower beams 36 and 37 extending in the directions of arrows Y1 and Y2, and the supporting members (sliders) 40 and 41 which are respectively slidably inserted into guide rails 38 and 39, to support both ends of the respective beams 36 and 37. The jacket opening enlarging mechanism 31 is guided by the guide rails 38 and 39, and moves between an innermost part of the reproducing apparatus 30 and a disc case inserting opening 59 provided at the frame of the reproducing apparatus 30, in the directions of arrows X1 and X2.

A reproducing transducer 42 comprises a pickup device 45, a resonator 46 and the like, and is mounted to a carriage 47. The carriage 47 is transferred in the directions of the arrows Y1 and Y2 by means of a transferring mechanism, in a state where rollers provided on the carriage 47 roll along rails 49a and 49b respectively provided on a chassis 48.

The disc holding mechanism 33 is provided at the inner part of the reproducing apparatus 30 on the opposite side of the inserting opening 59, and comprises a pair of upper and lower holding fingers 50 and 51.

Upon reproduction of the disc 15, the disc case 10 is inserted through the inserting opening 59 of the reproducing apparatus 30, by inserting the disc case 10 with the side of the lid plate 12 into the direction of the arrow X1. When the jacket opening enlarging mechanism 31 is pushed and moved in the direction of the arrow X1 by the disc case 10, the upper and lower beams 36 and 37 rotate, and enlarging fingers thus respectively move in directions so as to mutually separate from each other. Accordingly, the front part of the upper and lower jacket halves 13 is enlarged upwards and downwards, to enlarge the opening 23 of the jacket 11.

When the disc case 10 is inserted into the innermost part of the reproducing apparatus 30 together with the enlarging mechanism 31 through the upper side of the turntable 32, the upper and lower holding fingers 50 and 51 respectively hold a groove guard 15a of the disc 15.

Accompanied by the insertion of the disc case 10, locking fingers 52 and 52A relatively enter inside L-shaped cutouts 22 of the lid plate 12, and the rim portion 17 accordingly pushes contact fingers 53 and 53A. When the contact fingers 53 and 53A are pushed by the lid plate 12, left and right main levers 54 and 54A respectively rotate in counterclockwise and clockwise about shafts 56 and 56A, against a force exerted by a torsion spring 55, to be locked as will be described hereinafter. Due to the above rotations of the main levers 54 and 54A, the locking fingers 52 and 52A respectively rotate so as to separate from each other towards the left and right hand sides. Accordingly, the locking fingers 52 and 52A enter within the cutouts 22, to lock the lid plate 12. Therefore, the lid plate 12 is locked and held at the innermost part of the reproducing apparatus 30, in a state where the lid plate 12 is placed onto support fingers 57 and 57A.

Further, due to the operation of the lid plate connection releasing mechanism 35 and 35A, the connection between the lid plate 12 and the jacket 11 is released.

Hence, when the disc case 10 is pushed into the final position, the connection of the lid plate 12 with respect to the jacket 11 is released, and the lid plate 12 becomes locked by the locking fingers 52 and 52A. Thus, the disc 15 is in a state held by the upper and lower holding fingers 50 and 51.

Next, the jacket 11 is pulled out in the direction of the arrow X2. Since the lid plate 12 and the disc 15 are respectively locked and held as described above, only the jacket 11 moves in the direction of the arrow X2, leaving behind the lid plate 12 and the disc 15. Accompanied by this operation in which the jacket 11 is pulled out from the reproducing apparatus 30, the lid plate 12 and the disc 15 are relatively pulled out from the jacket 11. In a state where the jacket 11 is separated from the enlarging mechanism 31 and is completely pulled out from the reproducing apparatus 30, the disc 15 is supported horizontally at a position directly above the turntable 32, by the holding fingers 50, 51 and a support structure 58 which is in a raised position.

When a play operation is performed, the disc 15 is lowered and placed onto the turntable 32, and is clamped. In addition, the disc 15 is rotated clockwise together with the turntable 32.

Moreover, the carriage 47 moves in the direction of the arrow Y1 from a waiting position, to reproduce the information signal by the reproducing stylus which relatively scans the recording surface of the disc 15.

Next, an operation in which the disc 15 is recovered from within the reproducing apparatus 30, will now be described.

Upon completion of the reproducing operation, the disc 15 is pushed upwards by the support structure 58. The disc 15 which is pushed up, is held by the disc holding mechanism 33.

Upon recovering the disc 15, an empty jacket 11 is again inserted into the reproducing apparatus 30 through the inserting opening 59, with the opening of the jacket 11 first. Thus, the enlarging mechanism 31 is pushed by the jacket 11 and moves in the direction of the arrow X1, to enlarge the opening 23 of the jacket 11. As the jacket 11 is inserted towards the direction of the arrow X1, the disc 15 is relatively inserted into the jacket 11 through the opening 23 of the jacket 11.

When the jacket 11 is inserted into the innermost position inside the reproducing apparatus 30, the disc 15 becomes completely incased within the jacket 11, and furthermore, the locked and held lid plate 12 is relatively inserted within the opening of the jacket 11 to close the opening 23 of the jacket 11.

In addition, the lock with respect to the main levers 54 and 54A are released, and the main levers 54 and 54A rotationally return by following the movement of the jacket 11 which is pulled out in the direction of the arrow X2. Moreover, the lid plate 12 separates from the lid plate connection releasing mechanism 35 and 35A, and becomes connected to the jacket 11.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 30 to be recovered within the disc case 10.

Next, description will be given with respect to the construction and operation of an operation control mechanism for controlling operation upon disc loading mode and disc separating and recovering mode, which forms an essential part of the apparatus according to the present invention, with further reference to FIGS. 3 through 9.

Figure 3:
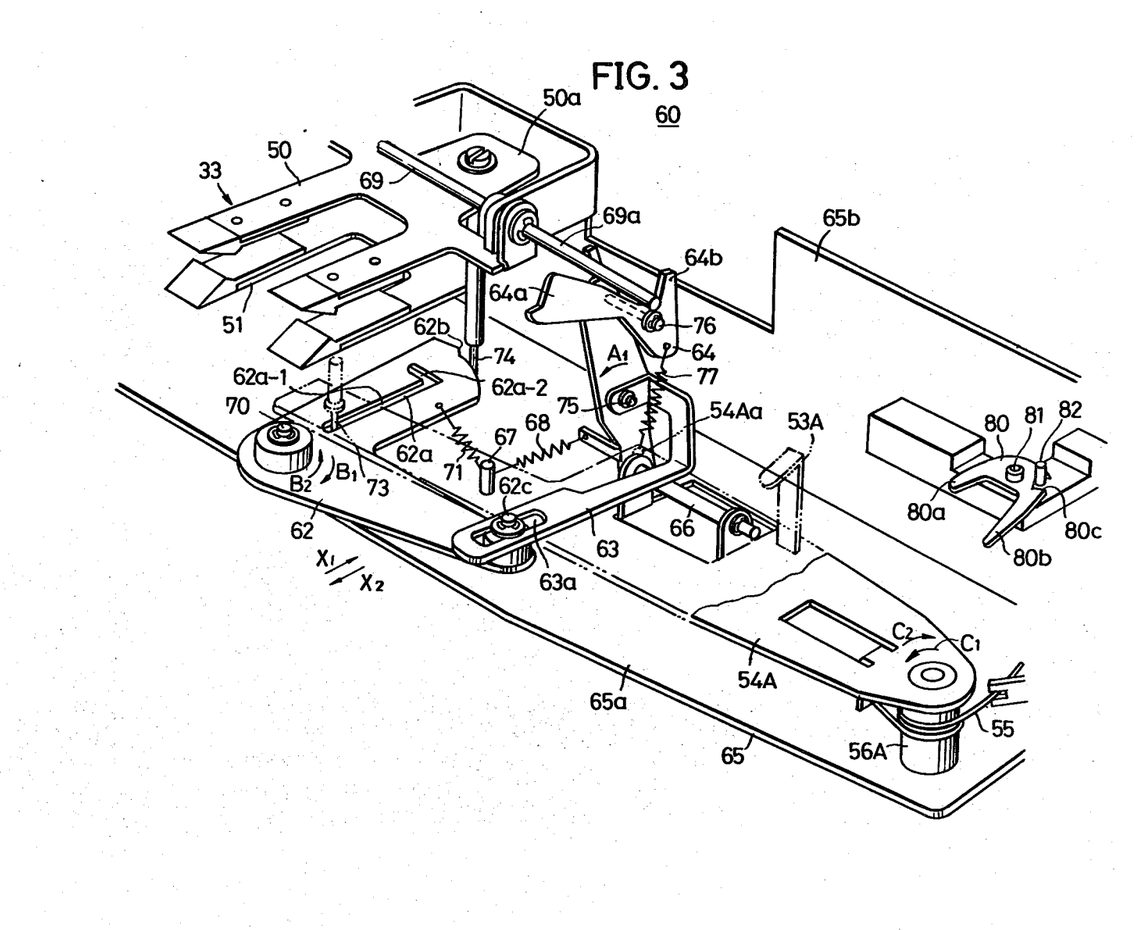
FIG. 3 is a perspective view, with a part cut away, showing an operation control mechanism which constitutes an essential part of the apparatus according to the present invention shown in FIG. 2.

The operation control mechanism 60 substantially comprises a rotatable arm 61, an L-shaped lock lever 62, a connecting lever 63, and a rotatable arm member 64.

The lower part of the rotatable arm 61 is supported by a shaft 66 which is supported on a bottom 65a of an L-shaped bracket 65, and the rotatable arm 61 is rotatable in a vertical plane. The L-shaped bracket 65 is fixed on a chassis, and supports the disc holding mechanism 33 and the like. The arm 61 is urged to rotate in the direction of an arrow A1 by means of a coil spring 68 stretched between a pin 67 fixed on the bottom 65a and the arm 61, and is in a rotational position where the free end of the arm 61 makes contact with an extention 69a of a shaft 69 for supporting the holding arms. This shaft 69 extends rightwards from the disc holding mechanism 33, as viewed in FIGS. 2 and 3.

The L-shaped lock lever 62 is pivotally supported about a pin 70 which is embeddedly fixed to the bottom 65a, and is urged to rotate in the direction of an arrow B, due to a coil spring 71. One arm part of the L-shaped lock lever 62 is formed with an L-shaped groove 62a, and a step cam 62b is formed at a distal end of the same arm part. A pin 62c is embeddedly fixed to a distal end of the other arm part of the lever 62. A vertical pin 72 is engaged at a distal end of the main lever 54A, inside the above L-shaped groove 62a. The step cam 62b confronts a vertical pin 74 embeddly provided on a lower surface of a projecting part 50a which is provided at the rear part side of the upper holding arm 50. The main lever 54A is pivotally supported about the pin 56A which is embeddedly provided on the bracket bottom 65a, at the proximal end of this main lever 54A. The main lever 54A is urged to rotate in the direction of an arrow C1 due to the rigid torsion spring 55. The contact finger 53A is provided on the main lever 54A.

One end of the connecting lever 63 is pivotally connected to a pin 75 on a lateral surface of the rotatable arm 61. A slot 63a is formed at the other end of this lever 63, and this slot 63a is engaged around the pin 62c.

The rotatable arm member 64 is supported on a horizontal pin 76 which is embeddedly provided at the upper part of the rotatable arm 61, and is rotatable in a vertical plane. A coil spring 77 is stretched between the rotatable arm member 64 and the rear corner of the main lever 54A. The rotatable arm member 64 has a projecting arm part 64a projecting toward the turntable, and an engaging arm part 64b projecting upwards. Furthermore, the arm member 64 undergoes rotation in accordance with the rotational position of the main lever 54A in such a manner that the projecting arm part 64a enters into a moving path of the jacket opening enlarging mechanism 31 upon a disc recovering operation.

The connection releasing claw 80 has a projection 80a which is pushed by the lid plate 12, and a claw part 80b adapted to engage with the engaging arm 18. The claw 80 is pivotally supported on a pin 81. This claw 80 can rotate within an angular range determined by a cutout 80c which is formed in the claw 80, and a pin 82.

Figure 4A:
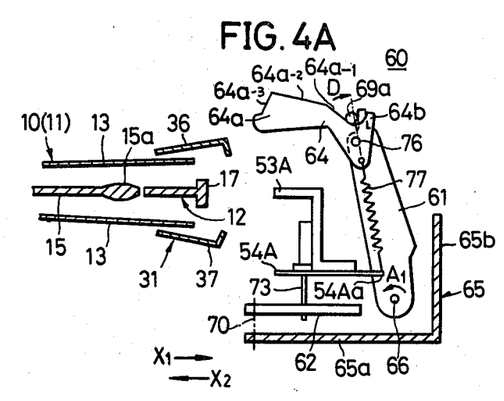
FIGS. 4A, 5A, 6A and 7A are side views, with a part in cross-section, respectively showing the operation control mechanism in a state before disc loading, in a state where the disc is loaded, in a state where the jacket is inserted for recovering the disc, and in a state where the jacket is inserted into the final position.
Figure 4B:
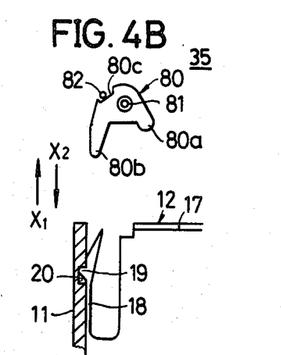
FIGS. 4B, 5B, 6B and 7B are plan views, with a part in cross-section, respectively showing relationships between a connection releasing claw and a lid plate, in states corresponding to the states indicated in FIGS. 4A, 5A, 6A and 7A.

Before loading the disc, the control mechanism 60 is in a state indicated in FIGS. 3 and 4A. That is, the rotatable arm 61 is in a state rotated in the direction of the arrow A1. Since the main lever 54A is in a state rotated in the direction of the arrow C1, and a part 54Aa where the spring 77 is hooked is in a position shifted toward the direction of the arrow X2, the spring 77 operates to rotate the arm member 64 toward the direction of an arrow D1. Accordingly, the arm member 64 is in a rotational position where a cutout surface 64a-1 makes contact with the shaft extension 69a, and the projecting arm part 64a is moved upward and is at a height position displaced upwards from the path for the jacket opening enlarging mechanism 31.

Figure 8A:
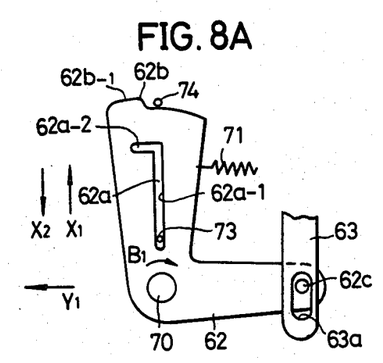
FIGS. 8A and 8B are plan views respectively showing relationships between a lock lever and a pin, upon disc loading mode and disc recovering mode.

Furthermore, in connection with the pin 73 positioned inside a groove portion 62a-1 extending along the direction of the arrow X1 of the L-shaped groove 62a, the lock lever 62 is in a rotational position indicated in FIGS. 3 and 8A.

Upon loading of the disc, the disc case 10 is inserted into the reproducing apparatus 30 in a state where the opening 24 of the jacket 11 is enlarged by means of the enlarging mechanism 31. Referring to FIG. 9, arrow lines 90a and 90b respectively indicate the disc case (or jacket) insertion locus and extraction locus upon the disc loading operation. The upper beam 36 of the enlarging mechanism 31 positioned at the front side along the disc case insertion direction, does not abut against the projecting arm part 64a of the rotational arm member 64, and enters into a space below the projecting arm part 64a. Therefore, the case 10 can be inserted, together with the enlarging mechanism 31, up to an innermost position P, and the control mechanism 60 and the connection releasing claw 80 respectively assume states indicated in FIGS. 5A and 5B. That is, the main lever 54A rotates, towards the direction of the arrow C2 against the spring 55, in a state where the contact finger 53A is pushed by the front of the lid plate 12. As the main lever 54A rotates, the pin 73 moves along the groove 62a of the lock lever 62, toward the direction of the arrow X1. When the pin 73 reaches the end of the groove 62a, the lock lever 62 can then rotate toward the direction of the arrow B1, by means of the spring 71, independent of the connecting lever 63. As the lock lever 62 rotates, the pin 73 enters into a groove portion 62a-2 extending along the direction of the arrow Y1 (referring to FIG. 8B), and the main lever 54A is locked at a position rotated toward the direction of the arrow C2. Furthermore, due to the above described rotation of the lock lever 62, the pin 74 moves in the relative relation with respect to the lock lever 62, and rides on a projection surface 62b-1 of the step cam 62b. Accordingly, the lid plate 12 is locked and held by the lid plate locking and holding mechanisms 34 and 34A, and the disc 15 is held between the upper and lower holding arms 50 and 51.

Figure 5A:
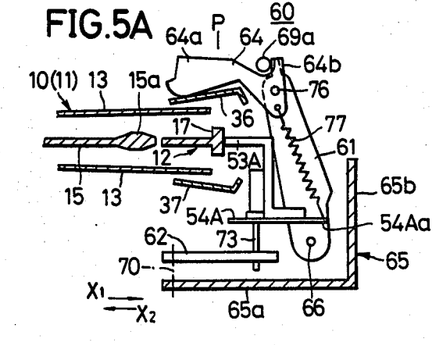
Figure 5B:
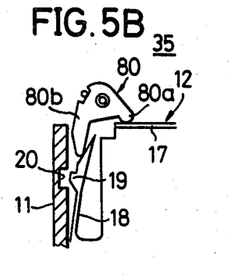
Figure 6A:
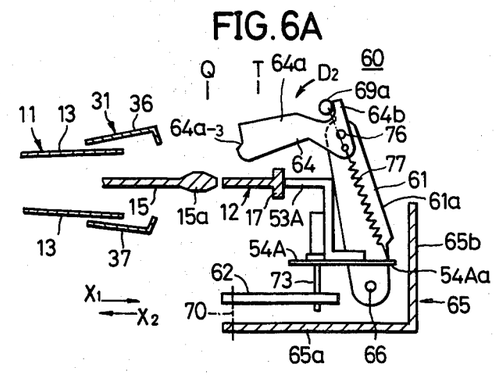
Figure 6B:
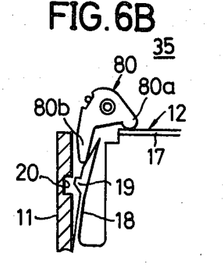

Furthermore, the rim portion 17 of the lid plate 12 pushes a projecting portion 80a, to rotate the connection releasing claw 80, as indicated in FIG. 5B. Due to the rotation of the claw 80, the claw portion 80b forcibly displaces the engaging arm 18 inwards. Accordingly, the projection 19 of the arm 18 slips out from the corresponding depression 20, to release the connection of the lid plate 12 with respect to the jacket 11.

Thereafter, when the jacket 11 is pulled out toward the direction of the arrow X2, only the jacket 11 moves in the direction of the arrow X2, leaving behind the lid plate 12 and the disc 15 at the innermost part of the apparatus. Then, responsive to a predetermined operation, the disc 12 is placed and loaded onto the turntable 32, and the disc reproducing operation can then be started.

Upon loading the disc, an operator may perform a so-called double pushing operation, in which the disc case is slightly pulled out and then inserted again, after the disc case 10 has been inserted up to the final position. In the conventional apparatus, the second pushing operation in this double pushing operation will release the locking of the main lever, and further, will release the holding of the disc which has been held responsive to an initial pushing operation. Accordingly, the disc is adversely incased within the jacket and will be pulled out together with the jacket. However, in the above described apparatus according to the present invention, as long as the extracting distance of the disc case is short enough so that the projecting arm part 64a of the rotatable arm member 64 remains riding on the upper beam 36, the mechanism which has been locked is not released but is maintained in the locked state even responsive to the double pushing operation. Accordingly, the disc 15 is positively loaded, and an erroneous disc loading does not take place.

Next, description will be given with respect to the operation of the above described mechanism, upon the disc recovering operation.

The empty jacket insertion and extraction loci with respect to the reproducing apparatus upon this operation, are respectively indicated by arrow lines 91a and 91b in FIG. 9.

In a state before the disc recovering operation is performed, the main lever 54A is at a position rotated toward the direction of the arrow C2. The 54Aa is at a position shifted toward the direction of the arrow X1, and the extension of the center line of the coil spring 77 passes at a position deviated towards the left-hand side with respect to the pin 76. Accordingly, the rotatable arm member 65 is in a state where the member 65 is urged to rotate towards the direction of the arrow D2, to rotate in the same direction until the engaging arm part 64b makes contact with the shaft extension 69a. The projecting arm part 64a is lowered to enter into the moving path for the upper beam 36.

Responsive to the insertion of the empty jacket 11 toward the direction of the arrow X1, the disc 15 is relatively inserted into the jacket 11, in a state where the opening 24 is opened by the enlarging mechanism 31. When the jacket 11 is inserted up to a position Q, the upper beam 36 abuts against the projecting arm part 64a, and causes the control mechanism 60 to operate responsive to a succeeding jacket insertion operation. That is, the rotatable arm member 64 moves toward the direction of the arrow X1, in a state where an upper edge surface 64a-2 of the projecting arm part 64a is guided by the shaft extension 69a. Thus, the rotatable arm 61 undergoes rotation in the direction of the arrow A2 against the spring 68. Here, as the rotatable arm 61 rotates, the arm member 64 is imparted with a torque in the direction of the arrow D1, that is, in the direction for causing the surface 64a-2 to push against the shaft extension 69a. Accordingly, when the upper beam 36 pushes the arm member 64 backwards, the arm member 64 will not unnecessarily rotate towards the direction of the arrow D2. Furthermore, since the front edge surface 64a-3 of the projecting arm part 64a assumes a step surface conforming to the shape of the upper beam 36, the upper beam 36 is stably fit with the front edge surface 64a-3, to assure stable operation for pushing the arm member backwards.

Due to the rotation of the arrow A2 of the rotatable arm 61, the connecting lever 63 shifts towards the direction of the arrow X1. The lock lever 62 rotates against to the spring 71, in a state where the pin 62c is engaged with the end part of the slot 63a.

Figure 8B:
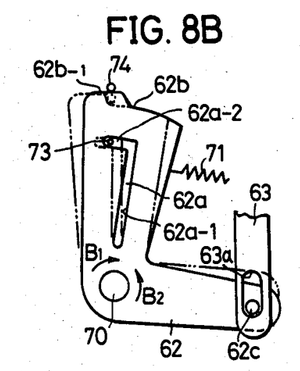
Figure 9:
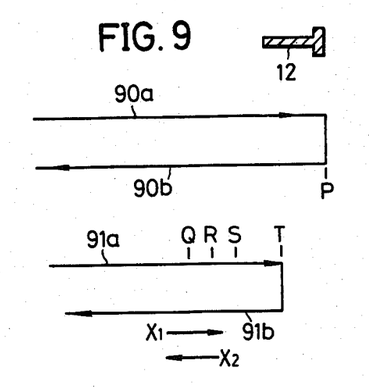
FIG. 9 is a schematic diagram showing jacket insertion and extraction loci upon disc loading operation and disc recovering operation, in comparison with each other.

Due to the initial rotation of the lock lever 62 to a position indicated by the two-dot chain line in FIG. 8B (a first time instant), the pin 74 is set free from the engagement with the projecting face 62b-1, and the locking of the holding mechanism 33 is released. When the lock lever 62 is further rotated (a second time instant), the pin 73 slips out from the arrow Y1 extending portion 62a-2 of the groove 62a, and hence, the locking of the lid plate locking and holding mechanisms 34 and 34A is released.

Referring to FIG. 9, a position R indicates a position where the jacket 11 has been inserted at the first time instant, and another position S indicates a position where the jacket 11 has been inserted at the second time instant.

At the time instant when the jacket 11 passes the position S, the main levers 54 and 54A are returned to rotate in the direction of the arrow C1 by a force exerted by the spring 55. As the main levers 54 and 54A rotate, the lid plate 12 is released from the locking and holding operation by the mechanisms 34 and 34A, and is pushed out toward the direction of the arrow X2 by the contact fingers 53 and 53A due to the force of the spring 55. That is, in a stage where the jacket 11 is inserted halfway, the lid plate 12 is released from the locked state and moves from a position indicated by the two-dot chain line to a position indicated by the full line in FIG. 7B, to make connection with the jacket 11.

Figure 7A:
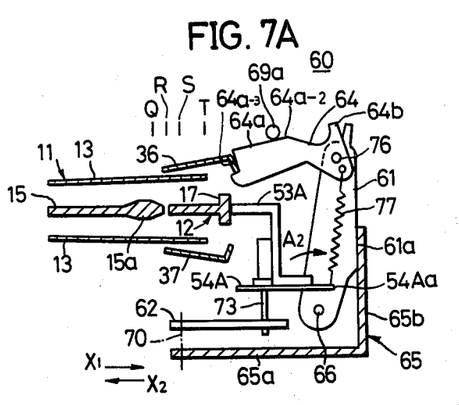
Figure 7B:
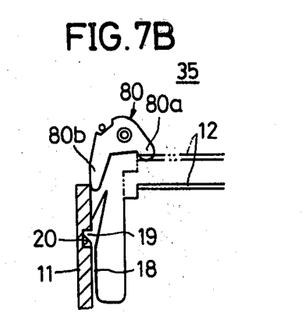

The jacket 11 can further be inserted toward the direction of the arrow X1. However, the jacket inserting operation is limited at a position T in FIg. 9, that is, at a stage where a rear edge 61a of the rotatable arm 61 abutts against an upright part 65b of the L-shaped bracket 65, and the arm 61 is limited from further rotating, as indicated in FIG. 7A. This position T is located at a position exceeding the position S and preceding the position T, and further preceding the position where the connection releasing claw 80 is operated by the lid plate 12.

Accordingly, at the time instant when the empty jacket 11 is inserted up to the final position T, the lid plate 12 is already connected to the jacket 11, and further, the lid plate 12 is in a position separated from the connection releasing claw 80. Therefore, even when an operation is performed in which the jacket is pulled out from the reproducing apparatus in a rapid manner, the lid plate 12 positively becomes connected to the jacket 11, and the disc recovering operation can be performed positively.

Moreover, since the connection releasing claw 80 is adapted to be pushed directly by the lid plate 12, this claw 80 can operate with a fine response characteristic.

Furthermore, the apparatus according to the present invention can be applied in the same manner to a disc case in which the lid unitarily comprises a lid part for closing the opening of the jacket and a loop fixed to the lid part, for encircling the disc.

Further, the present invention is not limited to these embodiments, but various variations and modifications may be made without departing from the scope of the present invention.

What is claimed is:

1. A rotary recording medium reproducing apparatus for reproducing a rotary recording medium accommodated within a case, said case comprising a jacket provided with a space for accommodating said rotary recording medium and an opening for allowing said rotary recording medium to go in and out of said jacket, and a lid member inserted through said opening of said jacket for closing said opening of said jacket, said rotary recording medium reproducing apparatus comprising:
   an inserting opening through which said case is inserted;
   lid member locking and holding means provided at an innermost part of said reproducing apparatus, for locking and leaving said lid member inside said reproducing apparatus when said case is inserted into said reproducing apparatus, and for releasing the locking with respect to said lid member when an empty jacket is inserted into said reproducing apparatus;
   lid member connection releasing means for releasing connection of said lid member with respect to said jacket when said case is inserted into and then pulled out from said reproducing apparatus, and for connecting said lid member to said empty jacket when said jacket is inserted into and then pulled out from said reproducing apparatus;
   lid member push-back means for pushing back said lid member released from locking in a direction approaching said empty jacket which is inserted, interrelatedly with the locking releasing operation of said lid member locking and holding means; and
   means maintained inoperative upon insertion of said case, and rendered operative upon insertion of said empty jacket, for limiting a final insertion position of said empty jacket inside said reproducing apparatus to a halfway position, the halfway position being a position where said lid member locking and holding means operates to release the locking of said lid member and said lid member push-back means operates but where said lid member connection releasing means remains inoperative.

2. A reproducing apparatus as claimed in claim 1 in which said reproducing apparatus further comprises a jacket opening enlarging means for enlarging said opening of said jacket upon insertion of said case or said empty jacket into said apparatus, capable of moving between a position in the vicinity of said inserting opening and an innermost part of said reproducing apparatus, and said insertion position limiting means enters into a moving path of said jacket opening enlarging means and catches to engage with the jacket opening enlarging means upon insertion of said empty jacket.

3. A reproducing apparatus as claimed in claim 2 in which said insertion position limiting means comprises:
   a rotatable engaging arm member rotatable and capable of going into and out of a moving path for said jacket opening enlarging means; and
   a mechanism for controlling a rotational position of said rotatable engaging arm member in accordance with the operating state of said lid member locking and holding means, and
   said rotatable engaging arm member is positioned exterior to the moving path when said lid member locking and holding means is not locking and holding said lid member, and entered into the moving path when said lid member locking and holding means is in an operative state for locking and holding said lid member.

4. A reproducing apparatus as claimed in claim 2 in which said insertion position limiting means comprises:
   a rotatable engaging arm member rotatable and capable of going into and out of a moving path for said jacket opening enlarging means;
   a mechanism for controlling a rotational position of said rotatable engaging arm member so that the rotatable engaging arm member enters into the moving path when the lid member locking and holding means is in a state for locking and holding said lid member;
   a support arm member for rotatably supporting said rotatable engaging arm member at a distal end thereof, and capable of rotating when said rotatable engaging arm member is engaged with and pushed by said jacket opening enlarging means; and a rotation limiting member for catching said support arm member to limit the rotation of the support arm member halfway.

5. A reproducing apparatus as claimed in claim 4 in which said rotation limiting member is an upright part of an L-shaped bracket, and said L-shaped bracket supports said support arm member.

6. A reproducing apparatus as claimed in claim 1 in which said apparatus further comprises a mechanism for locking said lid member locking and holding means in the state for holding said lid member, and a lock releasing mechanism for rendering said locking mechanism to a lock released state, interrelatedly with the operation of said jacket insertion limiting means for limiting the insertion of the empty jacket halfway.

* * * * *